(No Model.) 2 Sheets—Sheet 1.
S. & T. H. WIDDOWSON.
FRICTION CLUTCH.
No. 437,828. Patented Oct. 7, 1890.
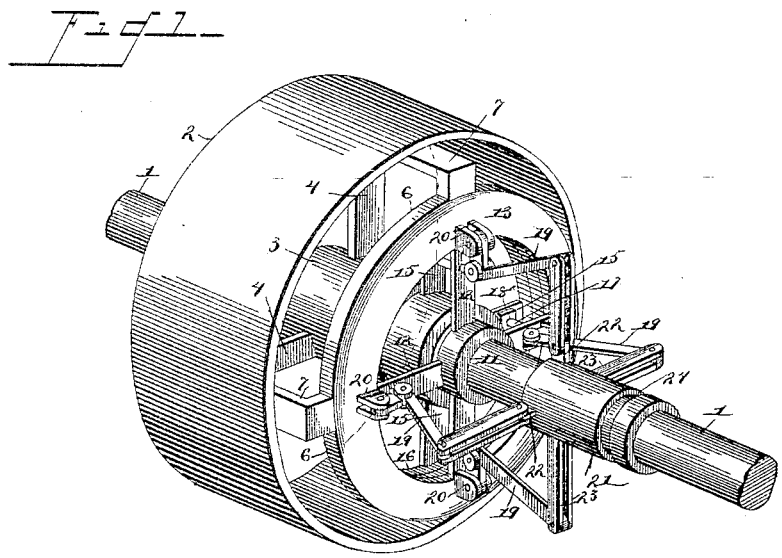
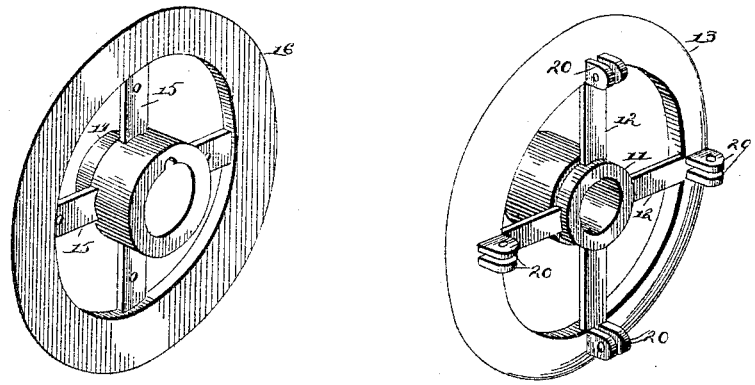
Witnesses
Geo. E. Frech
Wm. Bagger
Inventors
Samuel Widdowson
Thomas H. Widdowson
By their Attorneys,
C. A. Snow & Co.

(No Model.) 2 Sheets—Sheet 2.
S. & T. H. WIDDOWSON.
FRICTION CLUTCH.
No. 437,828. Patented Oct. 7, 1890.
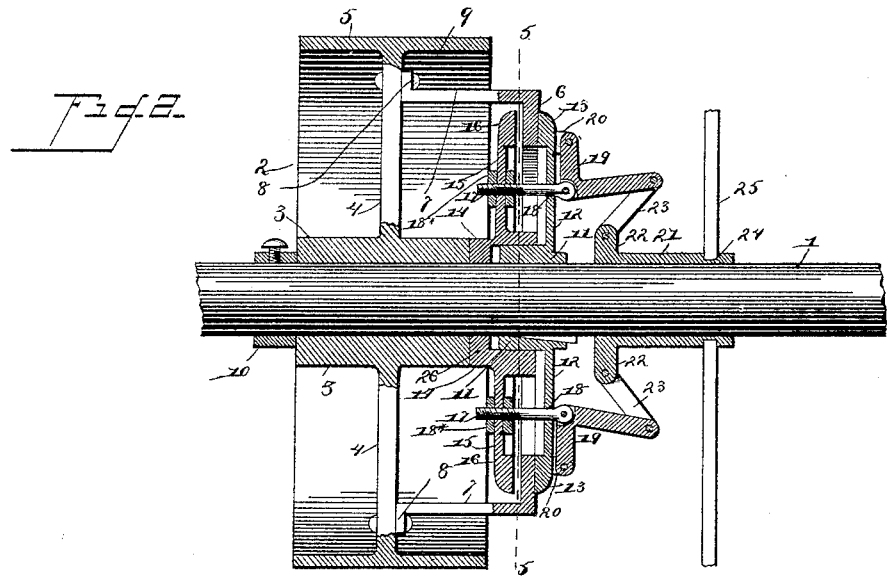
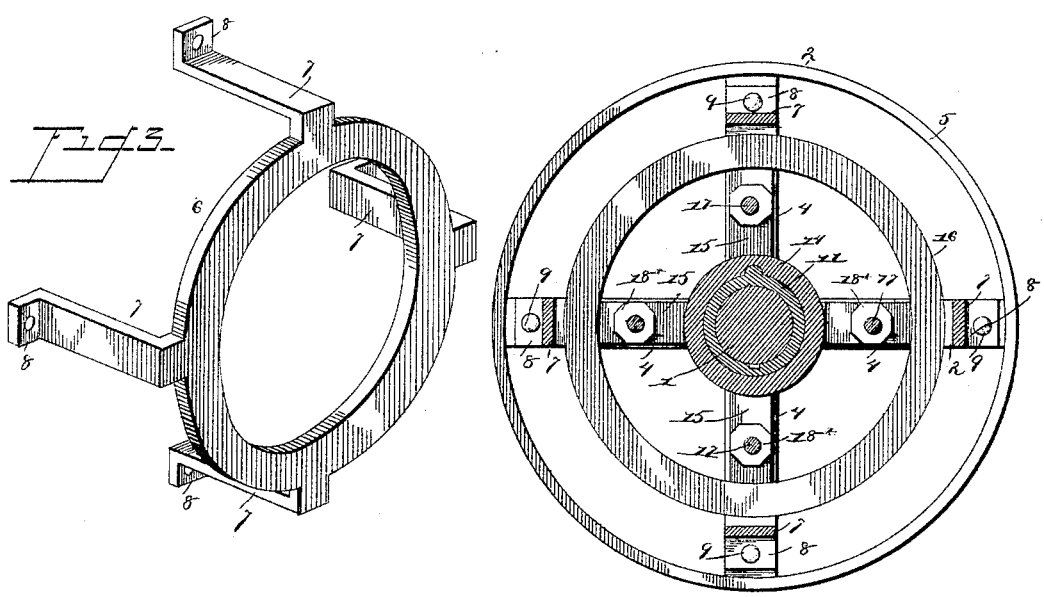
Witnesses
Geo. E. Frech.
Wm. Bagger
Inventor
Samuel Widdowson
Thomas H Widdowson
By their Attorneys.
C A Snow & Co.

UNITED STATES PATENT OFFICE.

SAMUEL WIDDOWSON AND THOMAS H. WIDDOWSON, OF DELAVAN, WISCONSIN.

FRICTION-CLUTCH.

SPECIFICATION forming part of Letters Patent No. 437,828, dated October 7, 1890.

Application filed May 13, 1890. Serial No. 351,653. (No model.)

*To all whom it may concern:*

Be it known that we, SAMUEL WIDDOWSON and THOMAS H. WIDDOWSON, citizens of the United States, residing at Delavan, in the county of Walworth and State of Wisconsin, have invented a new and useful Friction-Clutch, of which the following is a specification.

This invention relates to friction-clutches; and it has for its object to provide a device of this class which shall possess superior advantages in point of simplicity, durability, and general efficiency.

With these ends in view the invention consists in the improved construction, arrangements and combination of parts, which will be hereinafter fully described, and particularly pointed out in the claims.

In the drawings hereto annexed, Figure 1 is a perspective view showing a pulley mounted upon a shaft and equipped with our improved friction-clutch mechanism. Fig. 2 is a vertical sectional view of the same, taken longitudinally through the shaft. Fig. 3 is a perspective detail view showing the friction-ring detached from the pulley. Fig. 4 is a detail view showing the two friction-rings, which form a part of the clutch, detached. Fig. 5 is a transverse sectional view taken on the line 5 5 in Fig. 2.

Like numerals of reference indicate like parts in all the figures of the drawings.

1 designates the shaft, upon which is loosely mounted the pulley 2, which is of ordinary construction, being composed of the hub 3, spokes 4, and rim 5.

6 designates the friction-ring, which is provided with a series of laterally-extending arms 7, provided at their outer ends with perforated lugs 8 to receive the bolts 9, by means of which they are secured to the spokes 4 of the pulley, to which latter the said friction-ring is thus concentrically attached. The arms 7 are to be of sufficient length to hold the friction-ring 6 at one side of the rim of the pulley beyond said rim, so as to prevent the clutch mechanism from being interfered with by the belt or band running over the pulley. A collar 10 is secured upon the shaft 1, adjacent to one side of the hub of the pulley 2, to prevent the latter from moving laterally upon the shaft. Adjacent to the opposite end of the hub and at a short distance from the latter is keyed or otherwise secured a hub 11, having radially-extending arms 12, of which in the drawings hereto annexed four have been shown. The outer ends of the arms 12 carry the friction-ring 13, which is adjacent to the outer side of the friction-ring 6, attached to the pulley, as already described.

14 designates a collar, which is mounted loosely upon the hub 11, and is provided with radially-extending arms 15, carrying at their outer ends a friction-ring 16, adapted to bear against the inner side of the ring 6. The arms 15 of the collar 14 are in alignment with the arms 12 of the hub 11, and in the outer ends of the said arms 15 are secured the laterally-extending rods 17, which extend through perforations 18 in the arms 12. The rods 17, which are screw-threaded at their inner ends, are secured adjustably in the arms 15 by means of jam-nuts 18*. The outer ends of the rods 17 are connected pivotally to the bell-crank levers 19, the upwardly-extending arms of which are pivoted to lugs 20 upon the outer sides of the arms 12.

21 designates a collar, which is mounted slidingly upon the shaft, and which is provided with outwardly-extending lugs 22, which are connected by means of pivoted rods or links 23 with the outer ends of the outwardly-extending arms of the bell-crank lever 19. The collar 21 has an annular groove 24, engaged by a shipping-lever 25, by means of which the said collar may be moved upon the shaft to operate the clutch.

The collar 14, which is mounted loosely upon the hub 11, is provided at its inner edge with an annular flange 26, adapted to bear against the adjacent ends of the hub 3 of the pulley for the purpose of pushing the latter away from the fixed hub 11 of the clutch mechanism when the clutch is to be released.

The operation of our invention will be readily understood from the foregoing description, taken in connection with the drawings hereto annexed. When the collar 21 is moved by the shipping-lever away from the hub 11, the links 23 will actuate the bell-crank levers to bring the friction-rings 13 and 16 into close contact with the friction-ring 6, attached to the pulley, thus locking the latter upon the shaft. When the collar 21 is moved in the opposite direction, the sliding collar 14, having the arms 15 and friction-ring 16, is moved in the direction of the pulley, thus releasing the friction-ring 16 from contact with the friction-ring 6, and also causing the flange 26 to push the pulley carrying the said friction-ring 6 away from the friction-ring 13, thus completely releasing the clutch mechanism.

Our improved friction-clutch, it will be seen from the foregoing description, is very simple in construction and may be manufactured at a moderate expense. It is also capable of being easily applied to any pulley of any ordinary construction. Owing to the extensive friction-surface it will be understood that the pulley may be readily locked securely upon the shaft without the application of excessive or injurious pressure, and the pressure being applied evenly upon opposite sides of the friction-ring 6 there will be no injurious strain upon any part of the mechanism. The friction-surfaces may, if desired, be faced with Babbitt metal, wood, vulcanized fiber, or other suitable material.

We have in the foregoing described what we consider to be the preferred form of our improved friction-clutch; but we desire it to be understood that we reserve the right to any change and modifications in the construction of the same which may be resorted to without departing from the spirit of our invention.

Having thus described our invention, what we claim is—

1. The combination of the pulley, a friction-ring having laterally-extending arms secured to the spokes of said pulley, and friction-rings forming parts of the clutch and arranged to bear against opposite sides of the friction-ring attached to the pulley, substantially as set forth.

2. The combination of the pulley, a friction-ring having laterally-extending arms attached to the spokes of the same, a hub keyed upon the shaft adjacent to the pulley and having radially-extending arms carrying a friction-ring bearing against one side of the friction-ring attached to the pulley, a collar mounted slidingly upon said hub and having outwardly-extending arms carrying a ring adapted to bear against the other side of the friction-ring attached to the pulley, and suitable operating mechanism, substantially as set forth.

3. The combination of the pulley having a friction-ring attached thereto, a hub secured upon the shaft adjacent to said pulley, a collar mounted slidingly upon said hub and having a flange adapted to bear against the adjacent end of the hub of the pulley, the rings connected with the said fixed hub and sliding collar and adapted to engage opposite sides of the friction-ring attached to the pulley, and means for operating the clutch mechanism, substantially as set forth.

In testimony that we claim the foregoing as our own we have hereto affixed our signatures in presence of two witnesses.

SAMUEL WIDDOWSON.
   THOMAS H. WIDDOWSON.

Witnesses:
 SILAS W. MENZIE,
 BERND. M. JOHNSON.